Feb. 6, 1968   G. E. GREY ET AL   3,367,522
BALE WAGON RECEIVER
Filed April 13, 1965   4 Sheets-Sheet 3
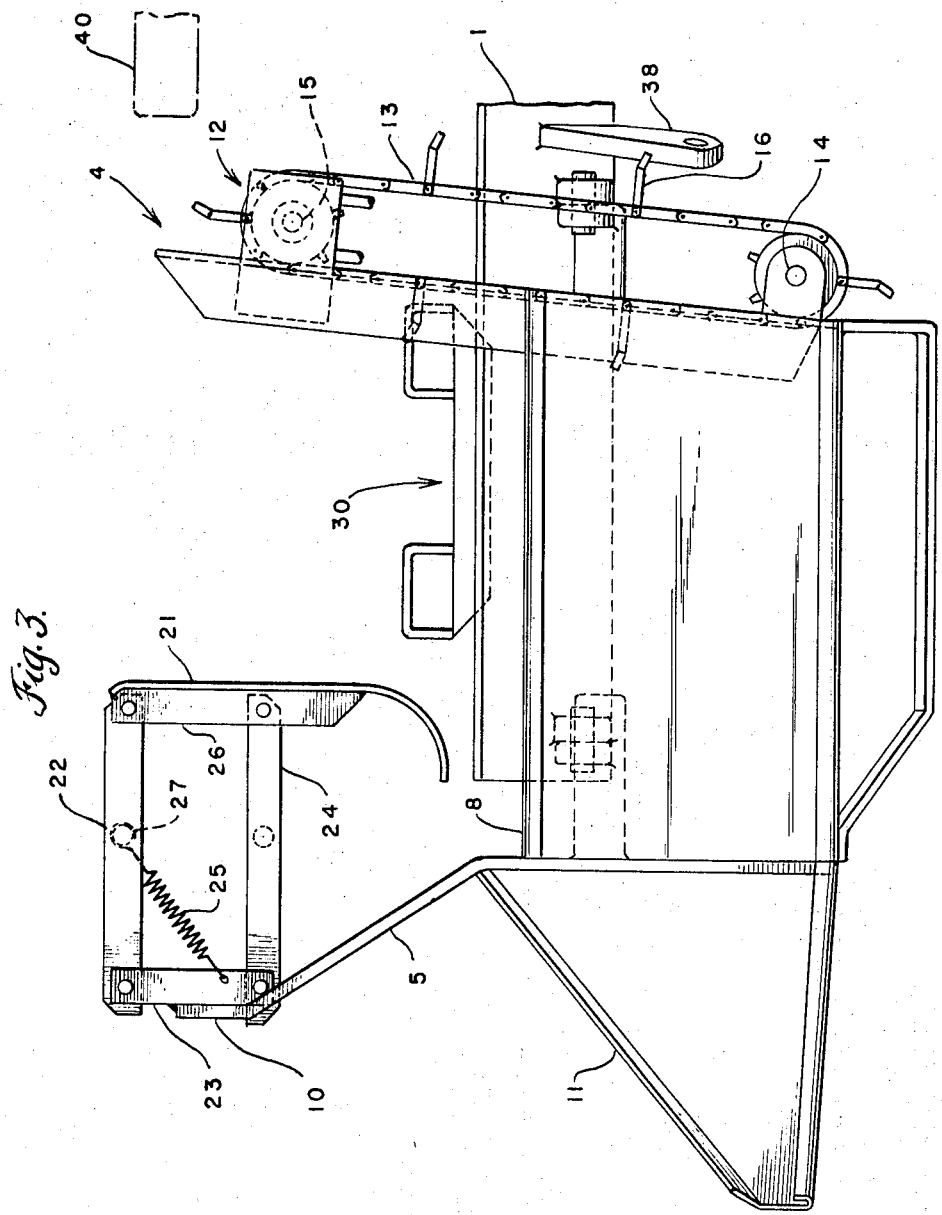
INVENTORS
Gordon E. Grey +
BY   William W. Wilson
Joseph A. Brown
ATTORNEY

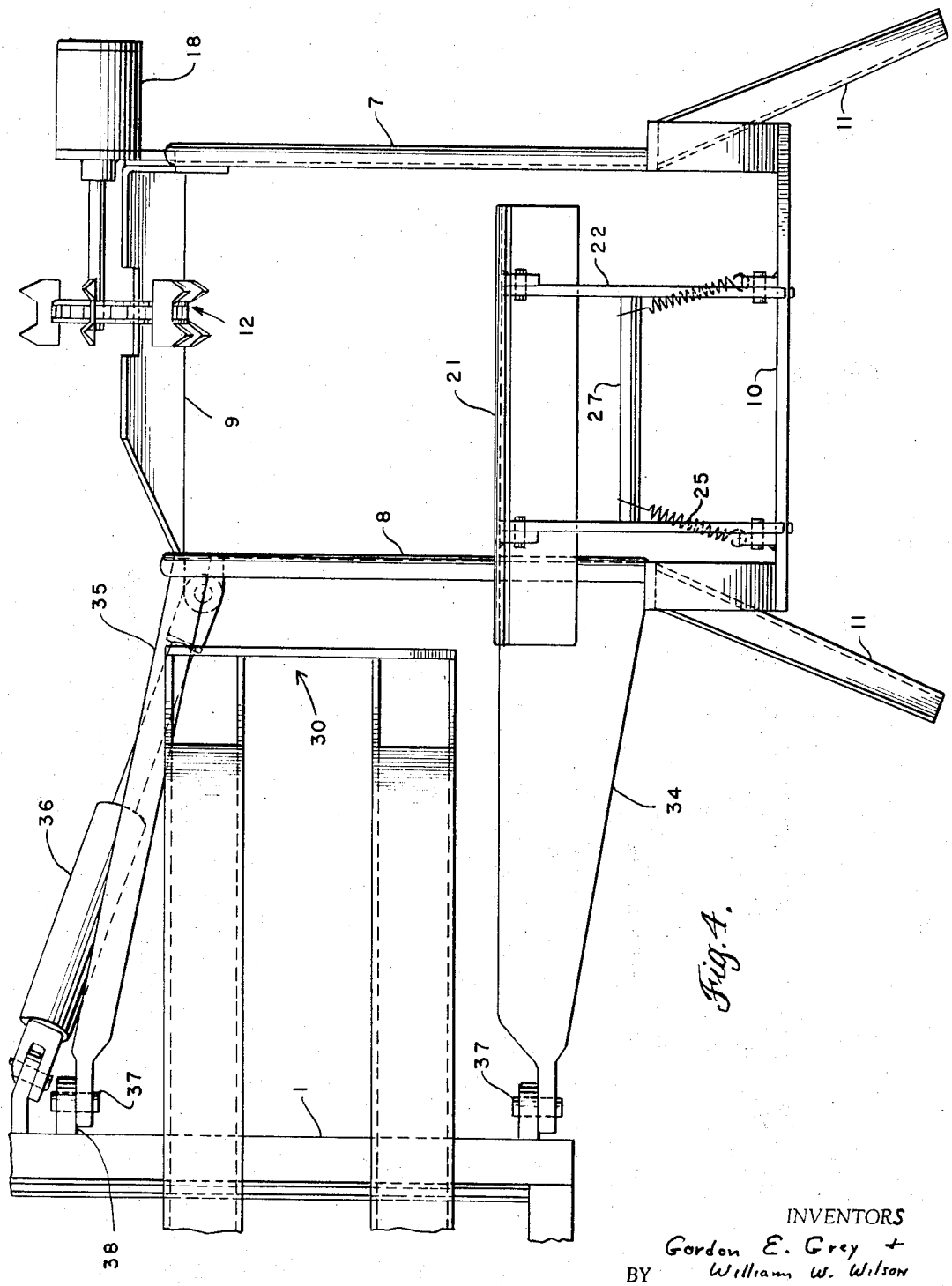

United States Patent Office 3,367,522
Patented Feb. 6, 1968

3,367,522
BALE WAGON RECEIVER
Gordon E. Grey, Kingsburg, and William W. Wilson, Selma, Calif., assignors to Sperry Rand Corporation, New Holland, Pa., a corporation of Delaware
Filed Apr. 13, 1965, Ser. No. 447,719
4 Claims. (Cl. 214—83.14)

ABSTRACT OF THE DISCLOSURE

A bale wagon having a bale loader with an offset chain conveyor and a yieldable guide shoe for holding bales in contact with the conveyor.

---

This invention relates generally to bale wagons or vehicles intended to handle baled products such as baled hay. More particularly, the invention relates to improvements in a bale loader for a bale wagon as disclosed in U.S. Patent No. 2,848,127.

The bale wagon disclosed in the patent noted above is provided with an automatic bale loader which picks up bales and deposits them on the wagon bed, as the wagon is pulled or driven along a series of bales lying on the ground in spaced relation to each other. In operation, bales enter the loader through deflector arms and engage a substantially vertical conveyor which upends and elevates the bales. After the bales have been elevated to a given height, the upper bale end contacts tipping bars which serve to laterally deflect the bales onto a receiving bed. A stationary guide shoe on the forward portion of the loader frame prevents the bales from falling forward as they are being elevated.

It has been found that the loading device described above works best when the bales are of uniform size and shape. However, when a bale is mis-shaped there is a tendency for the bale to become lodged in the automatic loader between the stationary guide shoe and the conveyor. Also, a distorted bale does not properly contact the tipping bars which results in the bale being improperly positioned on the receiving bed.

One object of this invention is to provide an improved automatic loading device which will better accommodate mis-shaped bales.

Another object of this invention is to provide a bale loader with a single means for upending, elevating and laterally deflecting a bale.

Another object of this invention is to provide an automatic bale loader with guide means which adjusts automatically to accommodate different bale shapes and sizes.

Another object of this invention is to provide an automatic bale loader with yieldable guide means.

A further object of this invention is to provide an automatic bale loader with a yieldable guide shoe which maintains a bale in engagement with a vertical conveyor and guides the bale as it falls onto a receiving table.

A still further object of this invention is to provide a pivotally mounted guide shoe which is spring-biased to an initial position.

Other objects of this invention will be apparent hereinafter from the specification and from the recital in the appended claims.

In the drawings:

FIG. 3 is an end view of FIG. 2 looking in the direction indicated by the line 3—3 of FIG. 2.

FIG. 4 is a plan view of FIG. 2 looking in the direction indicated by the line 4—4 of FIG. 2.

Figure 1:
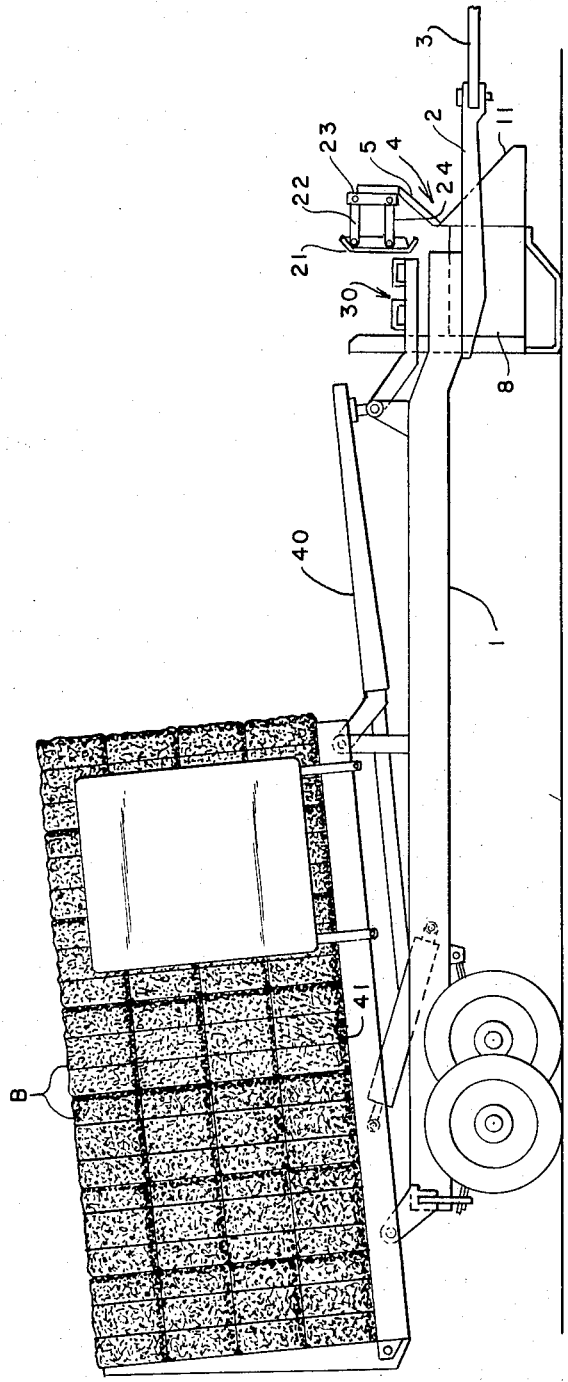
FIG. 1 is a side view showing a bale wagon having an automatic bale loader mounted thereon constructed according to this invention.

The bale wagon and automatic bale loader of this invention are shown in FIG. 1. The wagon comprises a chassis frame 1, a bale loader 4, a receiving bed 30, a transfer bed 40, and a load-carrying bed 41 having a load of bales B thereon. The chassis frame is supported adjacent its rear end by a pair of offset wheels on each side of the frame. A front axle joins the two inside wheels and a rear axle joins the two outside wheels. Each of the axles works independently of the other to provide greater wagon stability. The forward end of the chassis frame is provided with a hitch bar 2 connected to a drawbar 3, shown fragmentarily, arranged for connection to a tractor, not shown.

Figure 2:
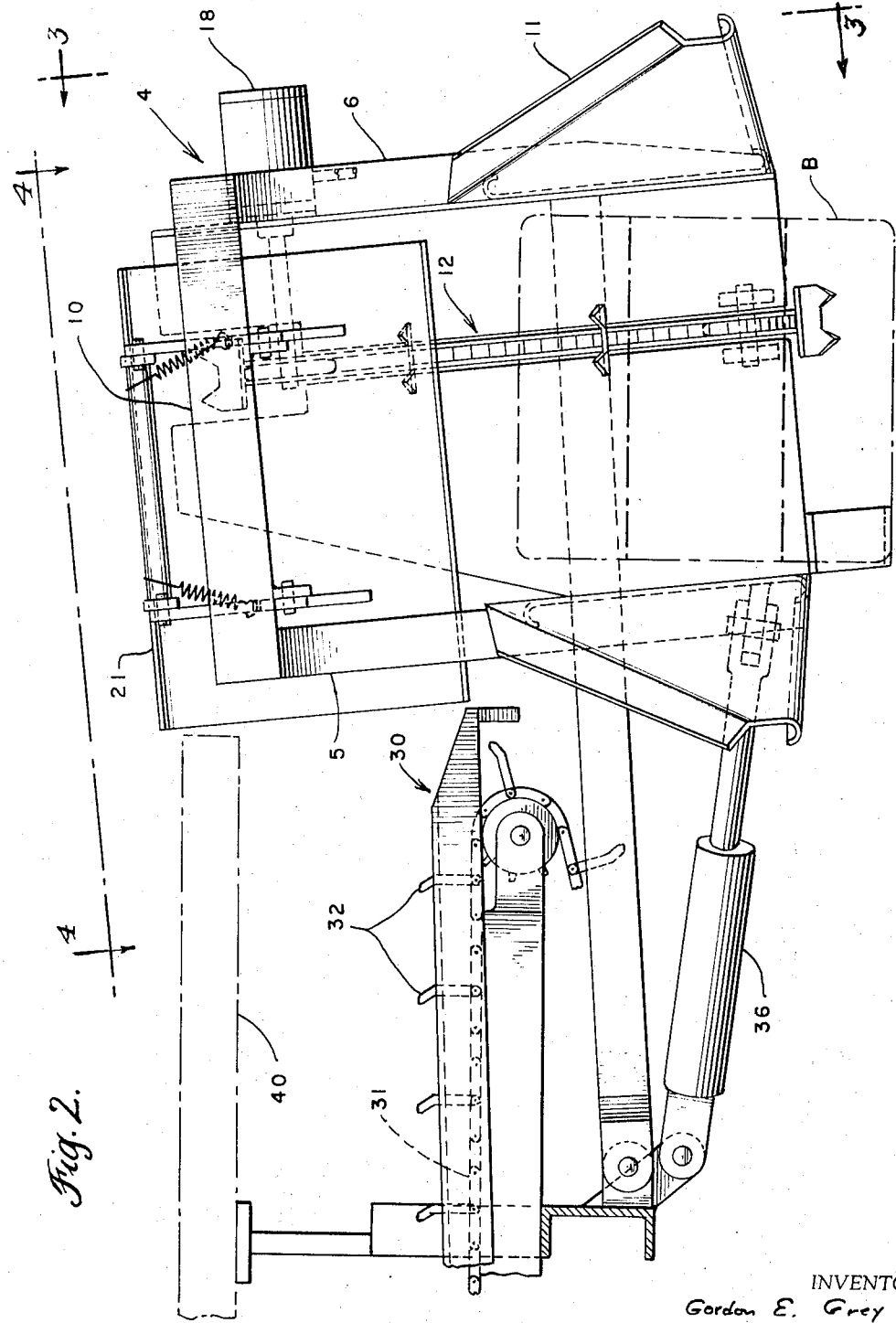
FIG. 2 is a side elevational view of the loader showing a portion of the receiving bed and conveyor chain, and a dot-and-dash indication of the transfer bed.

The automatic bale loader 4 is mounted on one side of the chassis 1 at the forward end thereof. The loader is supported on the chassis by a forward support arm 34, a rear support arm 35, and an adjustable support 36. Support arms 34 and 35 are pinned to brackets 38. As best shown in FIG. 2, the loader is mounted at an angle so that the upper portion is inclined toward the receiving bed. Adjustable support 36 may be lengthened or shortened to position the loader with respect to the receiving table.

The bale loader unit 4 comprises a pair of normally vertical side walls 7 and 8 joined to a rear wall 9 to form a U-shaped structure open at its forward end. Rear support arm 35 extends across rear wall 9 and is fixed thereto, as shown in FIG. 2. The lower forward extremities of the side walls 7 and 8 are provided with diverging deflector arms 11 which serve to guide the bales into the U-shaped frame.

At the rear end of the bale loader is a generally vertical conveyor 12 comprising a conveyor chain 13 which passes over sprockets provided on lower and upper shafts 14 and 15. The chain is provided with lugs or prongs 16. Upper shaft 15 is operatively connected to a hydraulic motor 16, carried by the loader unit, which drives the conveyor chain. As shown in FIG. 2, the bale loader and conveyor are inclined toward the receiving bed 30, so that as a bale is raised by the conveyor it is at an angle to the vertical and will fall on the receiving bed when it reaches the upper portion of the conveyor chain. It will also be noted that the conveyor chain is somewhat offset from the longitudinal center line of the bale loader (see FIG. 2). Since the conveyor chain is operating on one side of the bale only, there will be an additional force tending to rotate the bale toward the receiving bed. It has been found that the inclined loader in combination with the offset chain provides a positive single means for upending, elevating and laterally deflecting the bales onto the receiving bed. Thus, the necessity for tipping bars on the upper portion of the loader has been eliminated.

A yieldable guide shoe 21 is supported on vertical supports 5 and 6 on the forward portion of the loader. Guide shoe support means, as shown in FIG. 3, comprises a pair of upper horizontal supports 22 and a pair of lower horizontal supports 24. The horizontal supports are pivotally connected to vertical braces 26 on the guide shoe and to vertical uprights 23 which are secured to cross brace 10 on the bale loader structure. The guide shoe is spaced slightly less than a bale width from the conveyor. As a bale is elevated by the conveyor chain, it contacts the lower curved portion of the guide shoe and forces the shoe upwardly and forwardly against springs 25. When the shoe is forced upward, the horizontal supports rotate about their respective pivotal connections on the vertical uprights 23. Since the guide shoe is supported by both the upper and lower horizontal supports, the guide shoe will remain in a substantially vertical position as it moves upwardly.

A portion of the guide shoe extends laterally past the receiving bed in its upward extended position. Thus, when the shoe is in the "up" position, it serves to guide the bale as it falls onto the receiving bed. After the bale is moved laterally a sufficient distance on the receiving bed by conveyor 31, the guide shoe will return to its normal position (shown in FIG. 3) as a result of the action of springs 25. Further downward pivotal movement of the guide shoe is prevented by the extension of lower supports 24 which abut against cross brace 10.

From the foregoing, it will be evident that the yieldable guide shoe acts to hold the bale against the conveyor and assists in properly locating the bale on the receiving bed. If an irregularly shaped bale is encountered, the guide shoe will yield sufficiently to allow the bale to pass through the loader.

In operation, as the bale wagon is pulled through the field, it is steered toward a bale lying on the ground. As shown in FIG. 2, the deflectors 11 guide the bale B into the loader where it is contacted by the conveyor 12. Lugs 16 on the inclined conveyor chain 12 engage the bale to upend it and elevate it toward the receiving table. The yieldable guide shoe holds the bale against the conveyor chain as it moves upwardly and prevents the bale from falling forward. It will be seen that the guide shoe is particularly advantageous in operations where different sizes and shapes of bales are encountered.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the limits of the appended claims.

Having thus described our invention, what we claim is:

1. A bale wagon comprising a wheel supported maneuverable chassis adapted to travel forwardly along a series of bales lying on the ground in spaced relation to each other, a receiving bed mounted on a forward end of said chassis, a bale loader mounted on said chassis along one side thereof adjacent to and inclined laterally toward said receiving bed, said bale loader comprising a pair of laterally spaced vertical side walls, a rear wall connecting said side walls to form a U-shaped frame which opens forwardly to receive bales, each of said side walls having a forwardly located deflector for guiding bales into said loader, vertically travelling conveyor means on said rear wall and inclined toward said receiving bed for elevating bales and deflecting them onto said bed, a vertically extending guide shoe on the forward portion of said loader, said guide shoe being spaced from the ground to allow bales to pass beneath the shoe and into the loader and having a bottom edge adjacent said receiving bed, said guide shoe extending laterally from adjacent one of said side walls to the other side wall, said shoe being spaced less than one bale width from said conveyor and being adapted to yield a sufficient distance to allow a bale on said conveyor to pass between said shoe and said conveyor, a support means for said guide shoe comprising a pair of upper generally horizontal supports, a pair of lower generally horizontal supports parallel to said upper supports and parallel to each other, each of said supports being pivotally connected to said guide shoe and pivotally mounted on said loader, stop means for preventing said shoe from pivoting past a given position, and spring means biasing said support means against said stop means.

2. A bale wagon comprising a wheel supported maneuverable chassis adapted to be moved along a series of bales lying on the ground in spaced relation to each other, a receiving bed on said chassis, a bale loader mounted on said chassis and adapted to be guided into registry with a series of bales lying along the ground, said bale loader comprising a pair of laterally spaced vertical side walls, a rear wall connecting said side walls to form a U-shaped frame which opens forwardly to receive bales, a conveyor chain on said rear wall, said conveyor chain being inclined toward said receiving bed, and said conveyor chain being offset from the longitudinal center line of the loader to laterally deflect bales onto said bed.

3. A bale wagon, as recited in claim 2 wherein a guide shoe is mounted on a forward portion of said loader, said guide shoe is pivotally mounted and is adapted to pivot upwardly against spring biasing means.

4. A bale wagon, as recited in claim 1, wherein a vertical support is fixed to each of said side walls adjacent each of said deflectors, a cross brace extends between said vertical supports at their upper ends, and said horizontal supports are mounted on said cross brace.

References Cited

UNITED STATES PATENTS

| | | | |
|---|---|---|---|
| 2,372,902 | 4/1945 | Lewis. | |
| 2,848,127 | 8/1958 | Grey | 214—510 |
| 2,862,597 | 12/1958 | Priefert | 198—7 |
| 2,909,264 | 10/1959 | Kneib | 198—7 |

OTHER REFERENCES

"Automatic Bale Wagons," New Holland Machine Co., Form No. 9124, copyrighted November 1962.

GERALD M. FORLENZA, *Primary Examiner.*

J. E. OLDS, G. F. ABRAHAM, *Assistant Examiners.*